US012614166B2

(12) United States Patent
Vargas et al.

(10) Patent No.: US 12,614,166 B2
(45) Date of Patent: *Apr. 28, 2026

(54) METHOD AND SYSTEM FOR SELF-CHECKOUT IN A RETAIL ENVIRONMENT

(71) Applicant: Sensormatic Electronics, LLC, Boca Raton, FL (US)

(72) Inventors: Ricardo Vargas, Boca Raton, FL (US); Melwyn Sequeira, Plantation, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 96 days.

This patent is subject to a terminal disclaimer.

(21) Appl. No.: 18/504,909

(22) Filed: Nov. 8, 2023

(65) Prior Publication Data

US 2024/0070642 A1 Feb. 29, 2024

Related U.S. Application Data

(63) Continuation of application No. 17/471,045, filed on Sep. 9, 2021, now Pat. No. 11,829,990.

(Continued)

(51) Int. Cl.
*G06Q 20/32* (2012.01)
*A47F 9/04* (2006.01)
(Continued)

(52) U.S. Cl.
CPC .......... *G06Q 20/3226* (2013.01); *A47F 9/04* (2013.01); *G06Q 20/208* (2013.01);
(Continued)

(58) Field of Classification Search
CPC ... G06Q 20/208; G06Q 20/322; G06Q 20/325
See application file for complete search history.

(56) References Cited

U.S. PATENT DOCUMENTS 7,587,196 B2 * 9/2009 Hansen ................ G06Q 20/327
455/406
8,469,269 B2 6/2013 Daily et al.
(Continued)

OTHER PUBLICATIONS

Ghosh, T. B., "Application of RFID Technology in Sardar Vallabhbhai National Institute of Technology (SVNIT), Surat", In National Workshop on ICT Application in Library Automation-2007, Allahabad, India, Nov. 3, 2007, 15 pages.

(Continued)

*Primary Examiner* — Nathan A Mitchell
(74) *Attorney, Agent, or Firm* — ArentFox Schiff LLP

(57) ABSTRACT

The present disclosure relates to systems and methods for contactless checkout in a retail environment including a security pedestal located at an entrance or exit to a retail location. The system further includes a scanning device that is communicably coupled with the security pedestal. The self-checkout system and methods may also include a processing system that is configured to receive a list of items from the security pedestal and customer identification code from the scanning device. The system and method is configured to allow for a customer to scan his purchases at the security pedestal and pay for the purchases through the use of the customer identification code generated, preferably, using the customer's personal computing device.

20 Claims, 6 Drawing Sheets

100

Related U.S. Application Data

(60) Provisional application No. 63/077,073, filed on Sep. 11, 2020.

(51) Int. Cl.
| | | |
|---|---|---|
| *G06Q 20/20* | (2012.01) | |
| *G07G 1/00* | (2006.01) | |
| *G08B 13/00* | (2006.01) | |

(52) U.S. Cl.
CPC ......... *G06Q 20/322* (2013.01); *G06Q 20/325* (2013.01); *G07G 1/009* (2013.01); *G08B 13/00* (2013.01)

(56) References Cited

U.S. PATENT DOCUMENTS

| | | | | |
|---|---|---|---|---|
| 10,157,413 | B2* | 12/2018 | Landers, Jr. ........... | G01B 11/00 |
| 11,030,675 | B2 | 6/2021 | Kulkarni Wadhonkar et al. | |
| 11,393,301 | B1* | 7/2022 | Wilson ..................... | G07G 1/14 |
| 2013/0080279 | A1* | 3/2013 | Daily ..................... | G07G 1/009 |
| | | | | 705/23 |
| 2013/0254114 | A1* | 9/2013 | Smith ................ | G06Q 20/3274 |
| | | | | 705/18 |
| 2014/0172610 | A1* | 6/2014 | Carpenter .............. | G06Q 20/40 |
| | | | | 705/26.1 |
| 2014/0263631 | A1* | 9/2014 | Muniz .................. | G06Q 20/208 |
| | | | | 235/383 |
| 2015/0112825 | A1* | 4/2015 | Konishi ............... | G07G 1/0018 |
| | | | | 705/16 |
| 2018/0025601 | A1* | 1/2018 | Gao ..................... | G08B 13/246 |
| | | | | 340/572.1 |
| 2018/0047007 | A1* | 2/2018 | High .................. | G06K 7/10297 |
| 2018/0096331 | A1* | 4/2018 | Patil ..................... | G08B 13/246 |
| 2018/0232796 | A1* | 8/2018 | Glaser ................... | G06Q 90/20 |
| 2018/0341944 | A1* | 11/2018 | Gulchenko .......... | G06Q 20/347 |
| 2019/0172039 | A1* | 6/2019 | Kambara .............. | G06V 20/52 |
| 2019/0325407 | A1* | 10/2019 | Zhou .................. | G06Q 20/3274 |
| 2019/0362607 | A1* | 11/2019 | Shiraishi ............... | G06Q 20/18 |
| 2020/0019949 | A1 | 1/2020 | Simmons et al. | |
| 2020/0286059 | A1* | 9/2020 | Bengtsson ........... | G06F 21/554 |
| 2021/0019723 | A1* | 1/2021 | Karns ................. | G06Q 20/201 |
| 2022/0188796 | A1* | 6/2022 | Ueki ........................ | G07G 1/06 |
| 2022/0215396 | A1* | 7/2022 | Ueki ..................... | G06V 20/52 |

OTHER PUBLICATIONS

Wanzl, "eGate—dual protection at the check-out", Available on internet at <https://www.wanzl.com/en_GB/wanzl-inside/press-and-news/egate-dual-protection-at-the-check-out~n2778>, Feb. 2014, 1 page.

* cited by examiner

500

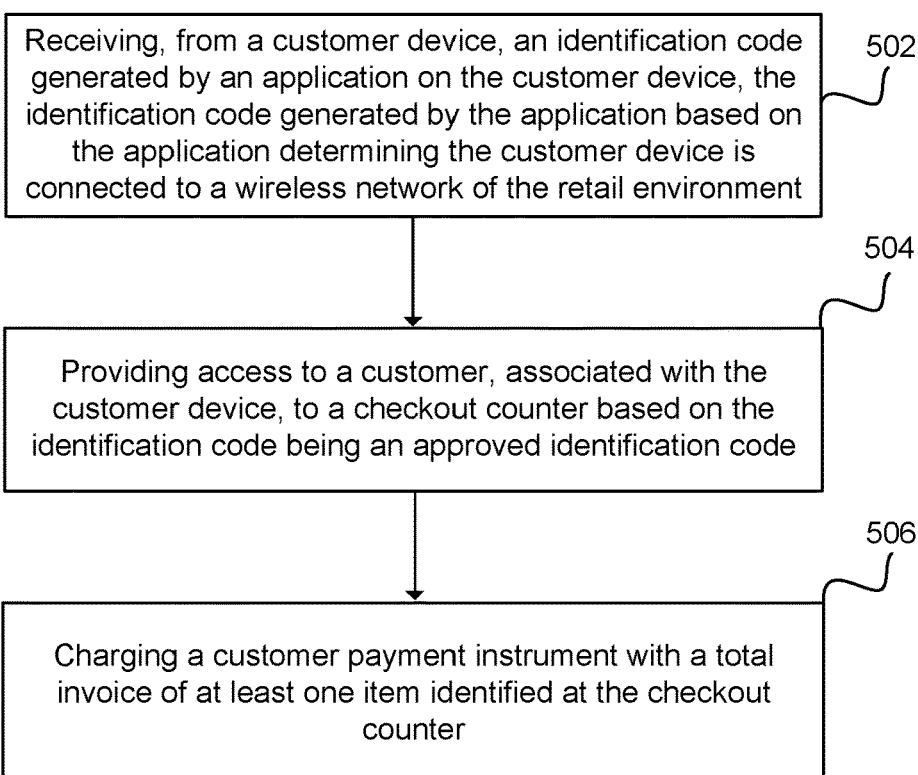

Receiving, from a customer device, an identification code generated by an application on the customer device, the identification code generated by the application based on the application determining the customer device is connected to a wireless network of the retail environment

502

Providing access to a customer, associated with the customer device, to a checkout counter based on the identification code being an approved identification code

504

Charging a customer payment instrument with a total invoice of at least one item identified at the checkout counter

METHOD AND SYSTEM FOR SELF-CHECKOUT IN A RETAIL ENVIRONMENT

CROSS-REFERENCE TO RELATED APPLICATION

This application is a continuation of U.S. patent application Ser. No. 17/471,045, entitled "METHOD AND SYS-TEM FOR SELF-CHECK-OUT IN A RETAIL ENVIRON-MENT," filed Sep. 9, 2021, which claims priority to U.S. Application No. 63/077,073, entitled "METHOD AND SYSTEM FOR SELF-CHECK-OUT IN A RETAIL ENVI-RONMENT," filed on Sep. 11, 2020, the disclosures of which are incorporated by reference herein in their entire-ties.

BACKGROUND

The present disclosure relates to customer checkout pro-cesses and systems in a retail environment, and more par-ticularly to enabling contactless self-checkout process and system in a retail environment.

Retailers are constantly looking for ways to simplify the experience of a customer at the store. The need for simpli-fication has led to many changes in the structure and technology used in retail stores. For example, the placement of products on aisles is now increasingly governed by advanced data analytics carried out by retail stores. Similar simplification exercises have influenced stores in supply chain management, product return processes, checkout, and theft detection and loss prevention.

In the current world where human contact is being actively discouraged, more and more stores are investing time and money in establishing self-checkout processes as well as enabling customers to pay for their purchases without having to interact with a store employee. While self checkout technology is seeing an upswing in investment, the ability to prevent losses is also of paramount interest for stores.

Thus, there is a need for a method and system to enable self checkout at retail stores.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In one aspect, the disclosure provides a system, method and non-transitory computer readable medium storing com-puter executable instructions that may be executed by a processor for self checkout in a retail environment. The system, method and non-transitory computer readable medium may include a scanning device configured to read a customer identification code. The system, method and non-transitory computer readable medium may also include a security pedestal comprising the scanning device. The sys-tem, method and non-transitory computer readable medium may also include receiving at the scanning device a cus-tomer identification code. The system, method and non-transitory computer readable medium may also include receiving a list of items that the customer has with them in proximity of the security pedestal. Further, the system, method and non-transitory computer readable medium may also include identifying the customer based on the customer identification code and providing an invoice to the customer for the list of items available with the customer. The system, method and non-transitory computer readable medium may also include providing the customer with a confirmation of payment receipt post successful completion of payment.

Additional advantages and novel features relating to implementations of the present disclosure will be set forth in part in the description that follows, and in part will become more apparent to those skilled in the art upon examination of the following or upon learning by practice thereof.

DESCRIPTION OF THE FIGURES

The novel features believed to be characteristic of the disclosure are set forth in the appended claims. In the descriptions that follow, like parts are marked throughout the specification and drawings with the same numerals, respec-tively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed descrip-tion of illustrative aspects of the disclosure when read in conjunction with the accompanying drawings, wherein:

FIG. 5 is a flow diagram of an example method of automatic checkout and billing, according to some imple-mentations.

DETAILED DESCRIPTION

This disclosure relates to systems and methods for con-tactless checkout in a retail environment. The present dis-closure describes a system having a security pedestal located at an entrance or exit to a retail location. Additionally, the system includes a scanning device that is communicably coupled with the security pedestal. The disclosed self check-out system and methods may also include a processing system that is configured to receive a list of items from the security pedestal and customer identification code from the scanning device. The system and method is configured to allow for a customer to scan his purchases at the security pedestal and pay for the purchases through the use of the customer identification code generated, preferably, using the customer's personal computing device.

Figure 1:
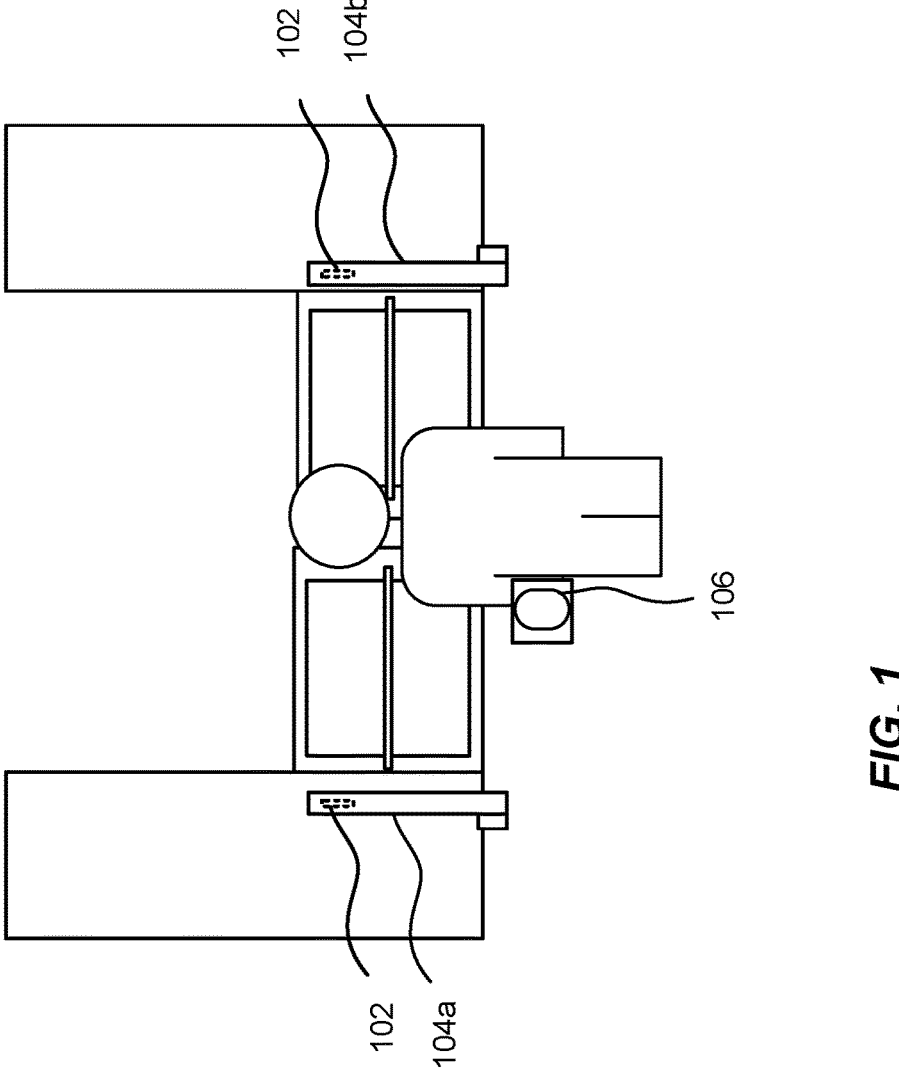
FIG. 1 is a schematic diagram of an example retail location.
Figure 1:

Referring now to FIG. 1, an example retail location system 100 includes multiple pedestal scanners 104*a* and 104*b*. Although two pedestals are shown, any number of pedestals may be implemented. The pedestal scanners 104*a* and 104*b* may be placed near an entrance or exit to a retail location for security purposes. For example, the retail location system 100 may have an entrance or exit located within a mall for customers to use when entering the retail location or exiting the retail location with their purchased items. The pedestal scanners 104*a* and 104*b* may be placed at these locations to alert workers of theft of items. For example, the pedestal scanners 104*a* and 104*b* may scan for security tags, as discussed below, placed on items to alert workers of theft. In another example, a customer may have purchased an item, but a worker failed to disable or remove the security tag, thus the pedestal scanners 104*a* and 104*b* may scan for security tags and thereby also alerting the workers of an issue. A person of skill in the art would understand that the disclosed systems and methods are applicable to a variety of retail locations and the present disclosure is not limited to the example retail location or areas.

As discussed above, retailers (e.g., apparel retailers) have deployed security tags such as acousto-magnetic or radio frequency identification (RFID) systems in stores to track product/item movements as the products/items arrive at stores, are placed on display on the sales floor, and are sold. For example, as customers enter and exit the retail location, the customers pass through one or more pedestal scanners 104*a* and 104*b*. Items, such as products sold by the retail establishment may include an security tag, not shown, (e.g., a RFID tag, an acousto-magnetic tag, or any other type of electronic article surveillance device) may be scanned by the pedestal scanners 104*a* and 104*b* to determine whether the item was paid for or not. For example, when the item is paid for, the security tag may be removed or deactivated so that the security tag will not be detected by the pedestal scanners 104*a* and 104*b*.

In some instances, the pedestal scanners 104*a* and 104*b* may detect that the item having the security tag is located near the scanners, and hence may be unpaid for and is being carried out of the retail location by an individual. As such, and discussed below, the pedestal scanners 104*a* and 104*b* and/or the security system may generate a security alert signal, which may activate one or more notification devices, such as an audio alarm device, a strobe or flashing light device, an image projected onto a surface and/or a notification message sent to security and/or store personnel.

In one aspect, the pedestal scanners 104*a* and 104*b* may include at least one scanning device 102. Although one scanning device is shown, any number of scanning devices may be implemented, for example, a single pedestal scanner and/or a plurality of pedestal scanners. The scanning device 102 may be embedded and built within the pedestal scanners 104*a* and 104*b*. For example, the scanning device 102, may be placed within the unit of the pedestal scanners 104*a* and 104*b* during production of the scanners to be incorporated into the overall design. In another aspect, the scanning device 102 may be attached to the pedestal scanners 104*a* and 104*b* after the scanners are built. For example, the scanning device 102 may contain a device for attaching the image projector to the pedestal scanner (e.g., a clip, bracket, attachment, etc.). In another aspect, the pedestal scanners 104*a* and 104*b* may contain a device for attaching the scanning device to the pedestal scanner (e.g., a clip, bracket, attachment, etc.). As shown in FIG. 1, the scanning device 102 may be configured to scan a QR code on a customer's computing device and read a customer identification code, but one skilled in the art would recognize that the scanning device 102 may be configured to scan any code generated on the customer's computing device 106. For example, the scanning device 102 may be a Near Field Communication (NFC) tag scanning device that is configured to identify a customer's computing device through the NFC chip present on the computing device. In another aspect, the scanning device 102 may be configured to read barcode generated using the customer's computing device 106. In other aspects, the scanning device 102 may be a device configured to read any one of SnapTag, Microsoft® Tags, MaxiCode, or Data Matrix codes.

In another aspect of the disclosure, the scanning device 102 may also be placed remotely with respect to the pedestal scanners 104*a* and 104*b*. The scanning device 102 and the pedestal scanners 104*a* and 104*b* may be communicably coupled with each other.

In one aspect of the disclosure, the pedestal scanners 104*a* and 104*b* and the scanning device 102 may have wireless and/or wired connectivity to communicate with a processing unit. The connectivity may be a wired or wireless connection such as, but not limited to, a universal serial bus (USB) connection, Wi-Fi connection, Bluetooth or Bluetooth Low Energy (BLE) connection, Ethernet connection, cable connection, digital subscriber line (DSL) connection, cellular connection (e.g., 3G, LTE/4G or 5G), or other suitable connections.

In one aspect, the scanning device 102 may be powered directly from the pedestal scanners 104*a* and 104*b* by drawing power directly from the powered pedestal scanners via hardwiring. In another aspect, the scanning device 102 may be powered individually by an electrical outlet, or by a battery.

As discussed above, the system also includes a processing unit which is configured to receive the customer identification code from the scanning device 102 and a list of items from the pedestal scanners 104*a* and 104*b*. A diagrammatic representation of the communication between the pedestal scanners, scanning device, and the processing unit can be seen in FIG. 2.

Figure 2A:
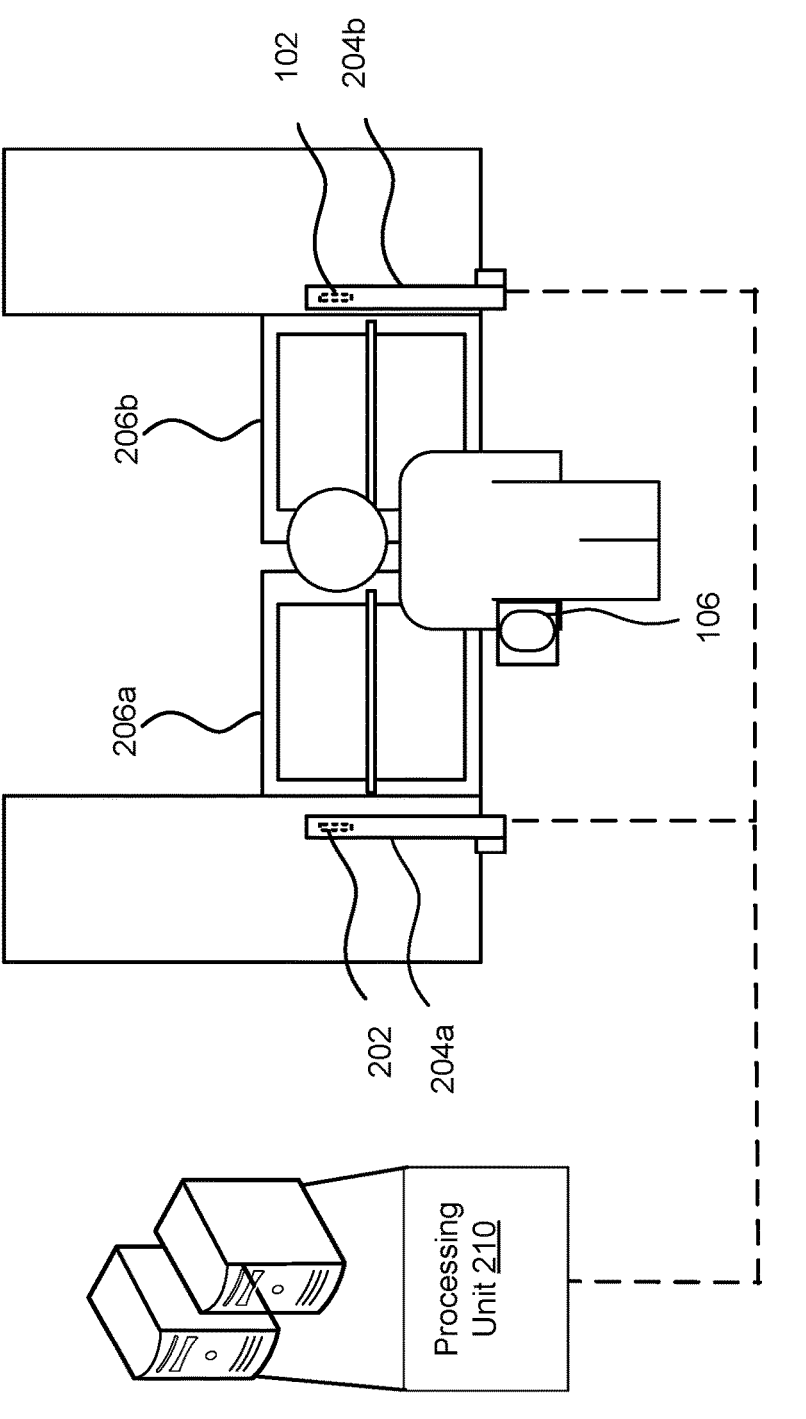
FIG. 2A is a first schematic diagram of an example retail location including an example of an automatic checkout and billing system.
Figure 2A:

Turning to FIG. 2A, is a schematic diagram of an example retail location including a second example of a pedestal projection system. The example retail location system 200 may also have a processing unit 210, and be in communication with the pedestal scanners 204*a* and 204*b*, and/or the scanning device 202. In some aspects, the processing unit may be a server located on site of the retail location, a server located in a remote location from the retail location, or can be a cloud based server.

In one aspect, the processing unit 210 may be a security server monitoring the potential theft of items based on the pedestal scanners 204*a* and 204*b*, as described above. For example, the pedestal scanners 204*a* and 204*b* may detect that an item is exiting a retail location without being purchased based on a RFID tag on the item. The pedestal scanners 204*a* and 204*b* may transmit a signal to the processing unit 210. For example, the signal may indicate to the processing unit 210 that inventory of a specific item should be reduced based upon the item exiting the store, and/or to notify the processing unit to activate an alert signal. As described below, based on a signal from the pedestal scanners 204*a* and 204*b* to the processing unit 210 that an item is being stolen, an alert may be triggered by the processing unit 210.

In certain retail locations, the pedestal scanners 204*a* and 204*b* may be used as checkout counters. In such situations, a customer may walk to the pedestal scanners and present items in her possession for the scanners to create a list of items that the customer wishes to purchase. In some embodiments, the customer may merely be in proximity of the pedestal scanners 204a and 204b. The pedestal scanners 204a and 204b may be configured to determine all the items present with the customer to create the list of items. The list of items is sent to the processing unit 210 for billing and checkout. The processing unit 210 is configured to compute a total bill that the customer is expected to pay (post application of discounts) for the purchases she makes.

In an aspect of the disclosure, the customer uses her computing device to identify herself with the help of a code generated on the computing device. The code may be presented to the scanning device 202 by presenting a screen of the computing device. The scanning device is configured to determine the customer identification code from the code presented. In one aspect of the disclosure, the customer identification code may be presented in the form of a QR code. In another aspect of the disclosure, the customer identification code may be presented in the form of codes such as bar code, High Capacity Color Barcodes (HCCB), Near Field Communication (NFC) tags, MaxiCode, and the like.

In an alternate embodiment, the customer identifies herself with the help of the code through the scanning device 202, either during the entry or during the exit from the store. Once the customer's identity is ascertained by the processing unit 210, a plurality of gates 206a and 206b that provide access to the pedestal scanners may be opened. Further, once the gates to the scanners 204a and 204b are opened, the sensors on the pedestal scanners may be enabled to transmit signals that interact with tags on the items that the customer has in her possession. As soon as the customer has completed presenting all the items she wishes to buy and she steps away from the pedestal, the gates may be closed.

In one aspect, the customer identification code is a customer number provided to the customer by the retail establishment. In another aspect, the customer identification code is a customer number provided to the customer by her banking institution. The customer identification code identified through the step of presentment of the code to the scanning device 202 is sent to the processing unit 210. The processing unit 210 is configured to determine a customer's payment information based on the customer identification code. The processing unit 210 is further configured to charge a customer's payment instrument (mobile wallet, credit card, internet banking account, loyalty account) with the total bill incurred by the customer for the list of items identified by the pedestal scanners 204a and 204b. Post successful payment notification, in an embodiment, the pedestal scanners 204a and 204b may be disabled for the customer to exit the retail store. In another embodiment, the customer may be notified of successful payment on her computing device.

The code including the customer identification code may be generated using many known applications available on the customer's computing device. In an embodiment, the retail store may have an application that is available for installation on the customer's computing device. The application may allow the customer to generate the code that may include the customer identification code among other details pertaining to the customer. In an embodiment, the application may allow the customer to generate the code only when the customer is connected with an in store wireless network. For example, the application may only allow generation of code when the customer is logged on the in store Wi-Fi. The ability to generate the code only when the customer is logged on to the in store wireless network allows the retail store to ensure that the code is generated only when the customer is actually present in the store. It may be obvious to one skilled in the art that the ability to establish physical presence of the customer in the store may be achieved through other location identification techniques such as Global Positioning System (GPS), cellular network triangulation, and the like.

In some embodiments, the processing unit 210 may also be configured to determine an identity of the customer using a plurality of image capturing devices present in the retail store. Further, the processing unit 210 may also be configured to utilize past transaction records to present the customer with a choice of payment modes that may be used to complete the payment for the current transaction.

In some other embodiments, the pedestals 204a and 204b may also be communicably coupled with biometric scanning devices. The scanning devices may be configured to scan a biometric identifier of the customer (face, eye, fingerprint, palm and the like) and process the total bill for the list of items based on the identity of the customer received through the biometric identifier.

Figure 2B:
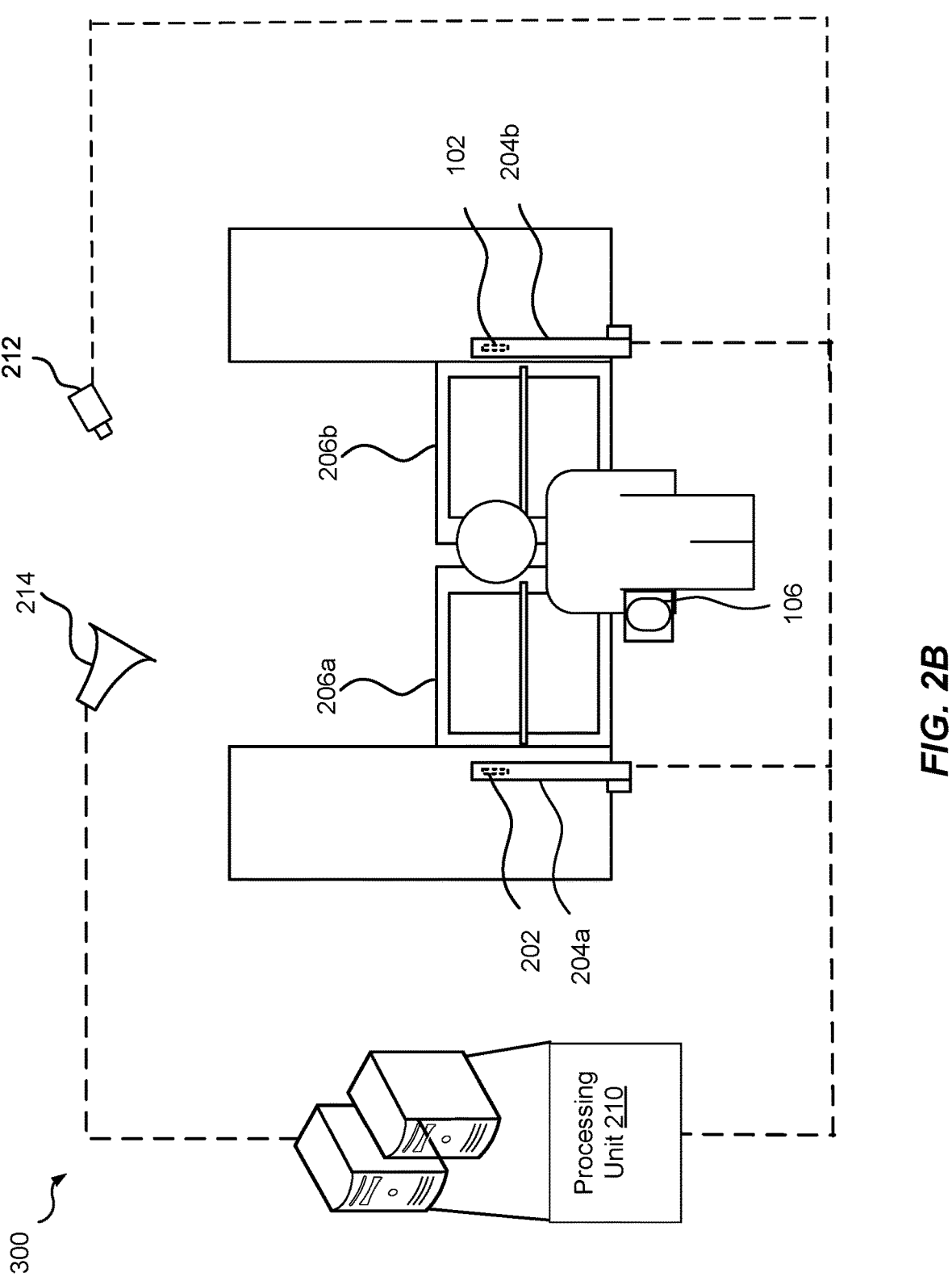
FIG. 2B is a second schematic diagram of an example retail location including an example of an automatic check-out and billing system.

In some aspects, as illustrated in FIG. 2B, the example retail location system 200 may also include video capture devices 212 positioned to capture activity in proximity to the pedestal scanners 204a and 204b and/or the plurality of gates 206a and 206b. Further, in some aspects, the processing unit 210 may be configured to detect a customer in proximity to the pedestal scanners 204a and 204b and/or the plurality of gates 206a and 206b, and/or one or more actions performed by the customer with respect to the pedestal scanners 204a and 204b and/or the plurality of gates 206a and 206b. In addition, the processing unit 210 may be able to determine whether a customer is attempting to identify herself via an identification code through the scanning device 202. In some aspects, the processing unit 210 may trigger an alert in response to determining that a customer is attempting to circumvent the security mechanisms (e.g., the customer is not attempting to identify herself to through the scanning device 202 while being in proximity to the pedestal scanners 204a and 204b and/or the plurality of gates 206a and 206b, trying to exit the retail environment without identifying herself via the scanning device 202, etc.). In some aspects, the processing unit 210 may employ one or more machine learning and/or pattern recognition techniques to determine that the customer is attempting to circumvent the security mechanisms (e.g., a multiple object tracker based on a deep neural network). Consequently, the processing unit 210 may alert workers of possible theft in response to activity at the pedestal scanners 204a and 204b and/or the plurality of gates 206a and 206b. In some aspects, the alert may be a notification sent to a notification device 214 associated with personnel (e.g., employees of the retail location, police officers, security guards, or any other person) within the retail location system 200, and/or an alarm reproduced by notification device 214. Examples of the alarm device 214 may include one or more of an audio alarm device (e.g., horn), a visual alarm device (e.g., light), a computing device (e.g., personal computer, laptop, mobile device) that receives messages such as text or email (or any form of communication), or any other device capable of alerting personnel of the unauthorized removal of the merchandise 162. In an example, the alarm device 214 may be located at the same location (e.g., retail store) as the pedestal scanners 204a and 204b and/or the plurality of gates 206a and 206b and/or may be located remote to the location.

Figure 3:
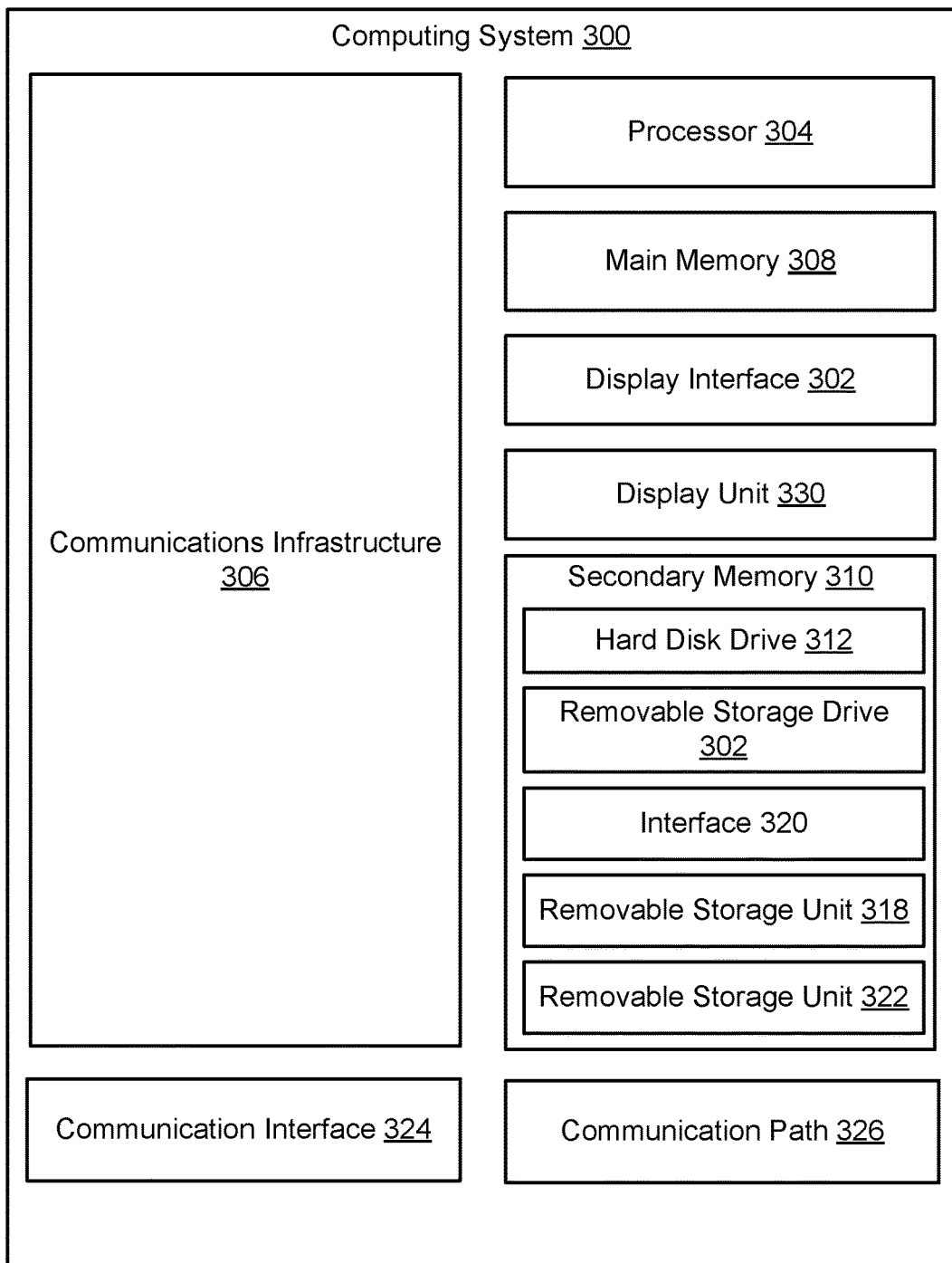
FIG. 3 is an example block diagram of various hardware components and other features of a computer system that may operate the checkout and billing systems in accordance with aspects of the present disclosure.

Aspects of the present disclosure may be implemented using hardware, software, or a combination thereof and may be implemented in one or more computer systems or other processing systems. In an aspect of the present disclosure, features are directed toward one or more computer systems capable of carrying out the functionality described herein. An example of such a computer system 300 is shown in FIG. 3.

Computer system 300 includes one or more processors, such as processor 304. The processor 304 is connected to a communication infrastructure 306 (e.g., a communications bus, cross-over bar, or network). Various software implementations are described in terms of this example computer system. After reading this description, it will become apparent to a person skilled in the relevant art(s) how to implement implementations of the disclosure using other computer systems and/or architectures.

Computer system 300 may include a display interface 302 that forwards graphics, text, and other data from the communication infrastructure 306 (or from a frame buffer not shown) for display on a display unit 330. Computer system 300 also includes a main memory 308, preferably random access memory (RAM), and may also include a secondary memory 310. The secondary memory 310 may include, for example, a hard disk drive 312, and/or a removable storage drive 314, representing a floppy disk drive, a magnetic tape drive, an optical disk drive, a universal serial bus (USB) flash drive, etc. The removable storage drive 314 reads from and/or writes to a removable storage unit 318 in a well-known manner. Removable storage unit 318 represents a floppy disk, magnetic tape, optical disk, USB flash drive etc., which is read by and written to removable storage drive 314. As will be appreciated, the removable storage unit 318 includes a computer usable storage medium having stored therein computer software and/or data.

Alternative implementations of the present disclosure may include secondary memory 310 and may include other similar devices for allowing computer programs or other instructions to be loaded into computer system 300. Such devices may include, for example, a removable storage unit 322 and an interface 320. Examples of such may include a program cartridge and cartridge interface (such as that found in video game devices), a removable memory chip (such as an erasable programmable read only memory (EPROM), or programmable read only memory (PROM)) and associated socket, and other removable storage units 322 and interfaces 320, which allow software and data to be transferred from the removable storage unit 322 to computer system 300.

Computer system 300 may also include a communications interface 324. Communications interface 324 allows software and data to be transferred between computer system 300 and external devices. Examples of communications interface 324 may include a modem, a network interface (such as an Ethernet card), a communications port, a Personal Computer Memory Card International Association (PCMCIA) slot and card, etc. Software and data transferred via communications interface 324 are in the form of signals 328, which may be electronic, electromagnetic, optical or other signals capable of being received by communications interface 324. These signals 328 are provided to communications interface 324 via a communications path (e.g., channel) 326. This path 326 carries signals 328 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 318, a hard disk installed in hard disk drive 312, and signals 328. These computer program products provide software to the computer system 300.

Implementations of the present disclosure are directed to such computer program products.

Computer programs (also referred to as computer control logic) are stored in main memory 308 and/or secondary memory 310. Computer programs may also be received via communications interface 324. Such computer programs, when executed, enable the computer system 300 to perform the features in accordance with implementations of the present disclosure, as discussed herein. In particular, the computer programs, when executed, enable the processor 304 to perform the features in accordance with implementations of the present disclosure. Accordingly, such computer programs represent controllers of the computer system 300.

In an aspect of the present disclosure where the disclosure is implemented using software, the software may be stored in a computer program product and loaded into computer system 300 using removable storage drive 314, hard drive 312, or communications interface 320. The control logic (software), when executed by the processor 304, causes the processor 304 to perform the functions described herein. In another aspect of the present disclosure, the system is implemented primarily in hardware using, for example, hardware components, such as application specific integrated circuits (ASICs). Implementation of the hardware state machine so as to perform the functions described herein will be apparent to persons skilled in the relevant art(s).

Figure 4:
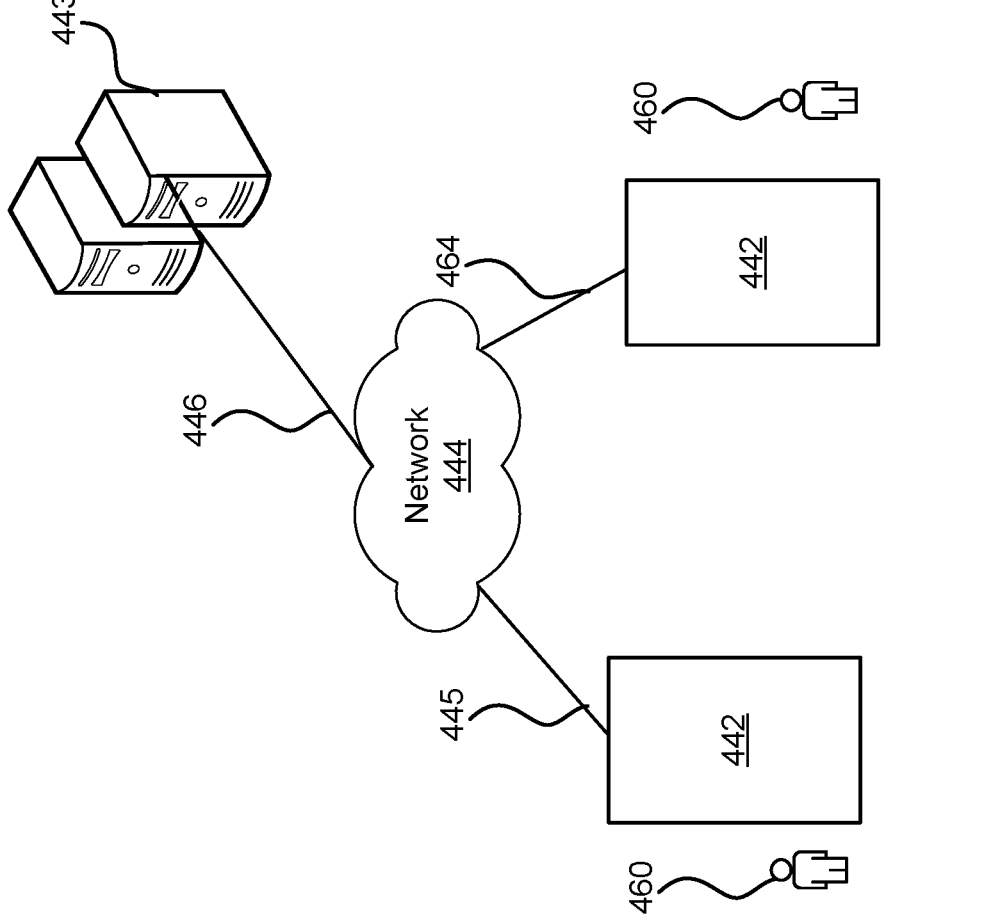
FIG. 4 is a block diagram of various example system components, for use in accordance with aspects of the present disclosure.

FIG. 4 is a block diagram of various example system components, in accordance with aspects of the present disclosure. FIG. 4 shows a communication system 400 including one or more accessors 460 (also referred to interchangeably herein as one or more "users"), one or more terminals 442. Terminals 442 can include retail location system 100 and/or retail location system 200, described above, or a related system, and/or the like. In one aspect, data for use in accordance with aspects described herein may be input and/or accessed by accessors 460 via terminal 442, such as personal computers (PCs), minicomputers, mainframe computers, microcomputers, telephonic devices, or wired/wireless devices, such as personal digital assistants ("PDAs") and RFID readers (e.g., handheld, mobile, cabinets, etc.) coupled to a server 443, such as a PC, minicomputer, mainframe computer, microcomputer, or other device having a processor and a repository for data and/or connection to a repository for data, via, a network 444 for instance, such as the Internet or an intranet, and couplings 445, 446, 464. The couplings 445, 446, 464 may include wired, wireless, or fiber-optic links. In another example variation, the method and system in accordance with aspects described herein operate in a stand-alone environment, such as on a single terminal.

The described processes in FIG. 5 below are illustrated as a collection of blocks in a logical flow graph, which represent a sequence of operations that can be implemented in hardware, software, or a combination thereof. In the context of software, the blocks represent computer-executable instructions stored on one or more computer-readable media that, when executed by one or more processors, perform the recited operations. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The operations described herein may, but need not, be implemented using the system 300 within the retail location systems 100 and 200. By way of example and not limitation, the method 500 is described in the context of FIGS. 1-4. For example, the operations may be performed by one or more of the scanning device(s) 102, the pedestal scanners 104a and 104b, scanning device(s) 202, the pedestal scanners 204a and 202b, the gates 206a and 206b, the processing unit 210, the video capture device(s) 212, and/or the notification device(s) 214.

FIG. 5 is a flow diagram illustrating an example method for implementing intelligent cloud service health communications, in accordance with some aspects of the present disclosure.

At block 502, the method 500 may include receiving, from a customer device, an identification code generated by an application on the customer device, the identification code generated by the application based on the application determining the customer is connected to a wireless network of the retail environment. For example, the scanning device 202 may be configured to scan a QR code on a customer device and read a customer identification code. In some aspects, the scanning device 202 may be a Near Field Communication (NFC) tag scanning device that is configured to identify a customer's computing device through the NFC chip present on the computing device. In another aspect, the scanning device 202 may be configured to read barcode generated using the customer's computing device. In other aspects, the scanning device 202 may be a device configured to read any one of SnapTag, Microsoft® Tags, MaxiCode, or Data Matrix codes. Further, an authorized application installed on the customer device may generate the identification code in response to determining the customer device is located within the retail location. For example, the authorized application may generate the identification code in response to determining that the customer device is connected to wireless network within the retail location.

Accordingly, the retail location system 100, the retail location system 200, the scanning device(s) 102, the scanning device(s) 202, the processing unit 210, computer system 300, and/or the processor 304 may provide means for receiving, from a customer device, an identification code generated by an application on the customer device, the identification code generated by the application based on the application determining the customer is connected to a wireless network of the retail environment.

At block 504, the method 500 may include providing access to the customer to a checkout counter based on the identification code being an approved identification code. For example, the processing unit 210 may receive the customer identification code from the scanning device 102, and determine the identity of the customer that presented the identification code using the customer device. Once the customer's identity is ascertained by the processing unit 210, a plurality of gates 206a and 206b that provide access to the pedestal scanners may be opened. Further, once the gates to the scanners 204a and 204b are opened, the sensors on the pedestal scanners may be enabled to transmit signals that interact with tags on the items that the customer has in her possession.

Accordingly, the retail location system 100, the retail location system 200, the scanning device(s) 102, the scanning device(s) 202, the pedestal scanners 204a and 202b, the gates 206a and 206b, the processing unit 210, computer system 300, and/or the processor 304 may provide means for providing access to the customer to a checkout counter based on the identification code being an approved identification code.

At block 506, the method 500 may include charging a customer payment instrument with a total invoice of at least one item identified at the checkout counter. For example, the processing unit 210 is configured to determine a customer's payment information based on the customer identification code. In addition, the processing unit 210 is further configured to charge a customer's payment instrument (mobile wallet, credit card, internet banking account, loyalty account) with the total bill incurred by the customer for the list of items identified by the pedestal scanners 204a and 204b. Further, in some aspects, in response to successful payment notification, the pedestal scanners 204a and 204b may be disabled for the customer to exit the retail store, and/or the customer may be notified of successful payment on her computing device.

Accordingly, the retail location system 100, the retail location system 200, the scanning device(s) 102, the scanning device(s) 202, the pedestal scanners 204a and 202b, the gates 206a and 206b, the processing unit 210, computer system 300, and/or the processor 304 may provide means for charging a customer payment instrument with a total invoice of at least one item identified at the checkout counter.

The aspects discussed herein can also be described and implemented in the context of computer-readable storage medium storing computer-executable instructions. Computer-readable storage media includes computer storage media and communication media, and may be, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of the processes/flowcharts disclosed is an illustration of example approaches. Based upon design preferences, it is understood that the specific order or hierarchy in the processes/flowcharts may be rearranged. Further, some features/steps may be combined or omitted. The accompanying method claims present elements of the various features/steps in a sample order, and are not meant to be limited to the specific order or hierarchy presented.

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

What is claimed is:

1. A system for processing customer orders in a retail environment, comprising:
    a scanning device configured to identify a customer based on an identification code, the identification code generated by an application installed on a customer device associated with the customer in response to the application determining the customer device is connected to a wireless network of the retail environment; and
    a security pedestal, communicably coupled with the scanning device, which is activated for scanning at least one item with the customer.

2. The system of claim 1, further comprising a server connected to the scanning device.

3. The system of claim 2, wherein the server is configured to provide a scanning result for the customer based on the identification code.

4. The system of claim 3, wherein the server is further configured to determine a payment instrument of the customer based on the scanning result.

5. The system of claim 4, wherein the server is configured to charge the payment instrument of the customer with a total invoice of the at least one item.

6. The system of claim 2, wherein the customer is a first customer, and the server is configured to:
    detect a second customer in proximity to the scanning device;
    determine the second customer is attempting to circumvent a security mechanism; and
    trigger an alert signal in response to the second customer attempting to circumvent the security mechanism.

7. The system of claim 1, wherein the scanning device is embedded into the security pedestal.

8. The system of claim 1, further comprising one or more gates configured to provide access to the security pedestal based on the identification code being an approved identification code.

9. The system of claim 1, wherein the security pedestal is configured to generate an alert signal based upon an indication of a theft of an item in the retail environment.

10. A method for processing customer orders in a retail environment, comprising:
    receiving, from a customer device, an identification code generated by an application on the customer device, the identification code generated by the application based on the application determining the customer device is connected to a wireless network of the retail environment; and
    providing access to a customer, associated with the customer device, to a checkout counter based on the identification code being an approved identification code.

11. The method of claim 10, wherein the checkout counter comprises at least one security pedestal.

12. The method of claim 11, further comprising scanning the at least one item at the at least one security pedestal.

13. The method of claim 10, further comprising generating an alert signal based upon an indication of a theft of an item in the retail environment.

14. The method of claim 10, wherein the customer is a first customer, and further comprising:
    detecting a second customer in proximity to a scanning device communicably coupled with the checkout counter;
    determining the second customer is attempting to circumvent a security mechanism; and
    triggering an alert signal in response to the second customer attempting to circumvent the security mechanism.

15. A non-transitory computer-readable device having instructions thereon that, when executed by at least one computing device, causes the at least one computing device to perform operations comprising:
    receiving, from a customer device, an identification code generated by an application on the customer device, the identification code generated by the application based on the application determining the customer device is connected to a wireless network of a retail environment; and
    providing access to a customer, associated with the customer device, to a checkout counter based on the identification code being an approved identification code.

16. The non-transitory computer-readable device of claim 15, wherein the operations further comprise:
    providing a scanning result for the customer based on the identification code.

17. The non-transitory computer-readable device of claim 15, wherein the operations further comprise:
    scanning at least one item at a security pedestal.

18. The non-transitory computer-readable device of claim 15, wherein the operations further comprise:
    generating an alert signal based upon an indication of a theft of an item in the retail environment.

19. The non-transitory computer-readable device of claim 15, wherein the customer is a first customer, and the operations further comprising:
    detecting a second customer in proximity to a scanning device communicably coupled with the checkout counter;

determining the second customer is attempting to circumvent a security mechanism; and triggering an alert signal in response to the second customer attempting to circumvent the security mechanism.

20. The non-transitory computer-readable device of claim 15, wherein the operations further comprise:

providing access to a security pedestal based on the identification code being an approved identification code.

\* \* \* \* \*